(12) United States Patent
Azad et al.

(10) Patent No.: US 10,998,853 B2
(45) Date of Patent: May 4, 2021

(54) INTERNET OF THINGS-ENABLED SOLAR PHOTOVOLTAIC HEALTH MONITORING AND ADVISING RELATED THERETO

(71) Applicant: International Business Machines Corporation, Armonk, NY (US)

(72) Inventors: Amar P. Azad, Bangalore (IN); Manikandan Padmanaban, Bangalore (IN); Kalyan Dasgupta, Bangalore (IN); Shivkumar Kalyanaraman, Bangalore (IN); Jagabondhu Hazra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 15/948,235

(22) Filed: Apr. 9, 2018

(65) Prior Publication Data

US 2019/0312547 A1 Oct. 10, 2019

(51) Int. Cl.
  *H02S 50/10* (2014.01)
  *G06N 3/08* (2006.01)
  *G06N 3/04* (2006.01)

(52) U.S. Cl.
  CPC .......... *H02S 50/10* (2014.12); *G06N 3/0445* (2013.01); *G06N 3/08* (2013.01)

(58) Field of Classification Search
  CPC . H02S 50/10; H02S 40/34; G06N 3/08; H02J 13/00
  See application file for complete search history.

(56) References Cited

U.S. PATENT DOCUMENTS

2011/0066401 A1 3/2011 Yang et al.
2013/0307556 A1* 11/2013 Ledenev ............... G01R 31/50
                                                      324/509
(Continued)

FOREIGN PATENT DOCUMENTS

CN 105356617 A 2/2016
JP 2014165369 A 8/2014

OTHER PUBLICATIONS

W. Chine, A. Mellit, A. M. Pavan and V. Lughi, "Fault diagnosis in photovoltaic arrays," 2015, International Conference on Clean Electrical Power (ICCEP), Taormina, pp. 67-72. (Year: 2015).*

(Continued)

*Primary Examiner* — Mohamed Charioui
*Assistant Examiner* — Christine Y Liao
(74) *Attorney, Agent, or Firm* — Ryan, Mason & Lewis, LLP

(57) ABSTRACT

Methods, systems, and computer program products are provided herein in connection with IoT-enabled solar PV health monitoring and advising related thereto. A computer-implemented method includes obtaining current-voltage samples corresponding to solar photovoltaic modules by triggering switch circuitry between (i) an inverter attributed to the solar photovoltaic modules and (ii) a current-voltage tracer; detecting one or more anomalies in the obtained current-voltage samples by applying machine learning techniques to the obtained current-voltage samples; automatically performing a root cause analysis on the detected anomalies by (i) converting the obtained current-voltage samples to sequential data, (ii) applying a sequence classifier to the sequential data, and (iii) identifying a pre-determined anomaly class comparable to the sequential data based on the application of the sequence classifier; and automatically (Continued)

generating and outputting a suggestion for remedial action based on the identified pre-determined anomaly class.

19 Claims, 9 Drawing Sheets

(56) References Cited

U.S. PATENT DOCUMENTS

| | | | | |
|---|---|---|---|---|
| 2014/0088776 | A1* | 3/2014 | Brandt | H02J 7/008 |
| | | | | 700/295 |
| 2015/0280644 | A1 | 10/2015 | Gosten et al. | |
| 2018/0121792 | A1* | 5/2018 | Tristan | G06N 3/0445 |
| 2018/0188704 | A1* | 7/2018 | Cella | G05B 11/32 |
| 2019/0219981 | A1* | 7/2019 | Lepratti | G05B 23/0224 |

OTHER PUBLICATIONS

Papageorgas et al. A Low-Cost and Fast PV I-V Curve Tracer Based on an Open Source Platform with M2M Communication Capabilities for Preventive Monitoring. Energy Procedia 74 (2015): 423-438.

Adhyda et al., An IoT Based Smart Solar Photovoltaic Remote Monitoring and Control Unit, 2016 2nd International Conference on (pp. 432-436).

* cited by examiner

US 10,998,853 B2

INTERNET OF THINGS-ENABLED SOLAR PHOTOVOLTAIC HEALTH MONITORING AND ADVISING RELATED THERETO

FIELD

The present application generally relates to information technology, and, more particularly, to solar photovoltaic (PV) panel management.

BACKGROUND

Soiling, shading, shadowing, panel cracks, etc. represent significant problems for solar farms due to blocking and/or covering of portions of PV panels within the farms. Further, other non-shading/soiling factors such as leaky capacitor, blown fuse, inverter failure, etc. could also significantly reduce the power output. However, conventional PV panel maintenance approaches fail to identify and characterize the particular reason(s) for PV panel under-performance in a timely and consistent manner. Such a task is important to PV panel and/or solar farm management because different types of shading or soiling require different types of cleaning mechanisms, and different types of hardware issues require different resolution mechanisms as well.

Conventional solar farm maintenance techniques generally involve human technicians physically inspecting PV panels to determine the potential requirements of resources and remedial actions. Such techniques, however, are time-consuming and highly expensive.

SUMMARY

In one embodiment of the present invention, techniques for Internet of Things- (IoT-) enabled solar PV health monitoring and advising related thereto are provided. An exemplary computer-implemented method can include obtaining current-voltage samples corresponding to one or more solar photovoltaic modules by triggering switch circuitry between (i) an inverter attributed to the one or more solar photovoltaic modules and (ii) a current-voltage tracer, and detecting one or more anomalies in the obtained current-voltage samples by applying one or more machine learning techniques to the obtained current-voltage samples. Such a method can also include automatically performing a root cause analysis on the one or more detected anomalies by (i) converting the obtained current-voltage samples to sequential data, (ii) applying a sequence classifier to the sequential data, and (iii) identifying at least one pre-determined anomaly class comparable to the sequential data based on the application of the sequence classifier to the sequential data. Further, such a method can include automatically generating and outputting a suggestion for one or more remedial actions based on the at least one identified pre-determined anomaly class.

In another embodiment of the invention, an exemplary computer-implemented method can include automatically performing a root cause analysis on the one or more detected anomalies by (i) extracting one or more features from the obtained current-voltage samples, (ii) applying a feature-based classifier to the one or more extracted features, and (iii) identifying at least one pre-determined anomaly class comparable to the obtained current-voltage samples based on the application of the feature-based classifier to the one or more extracted features.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
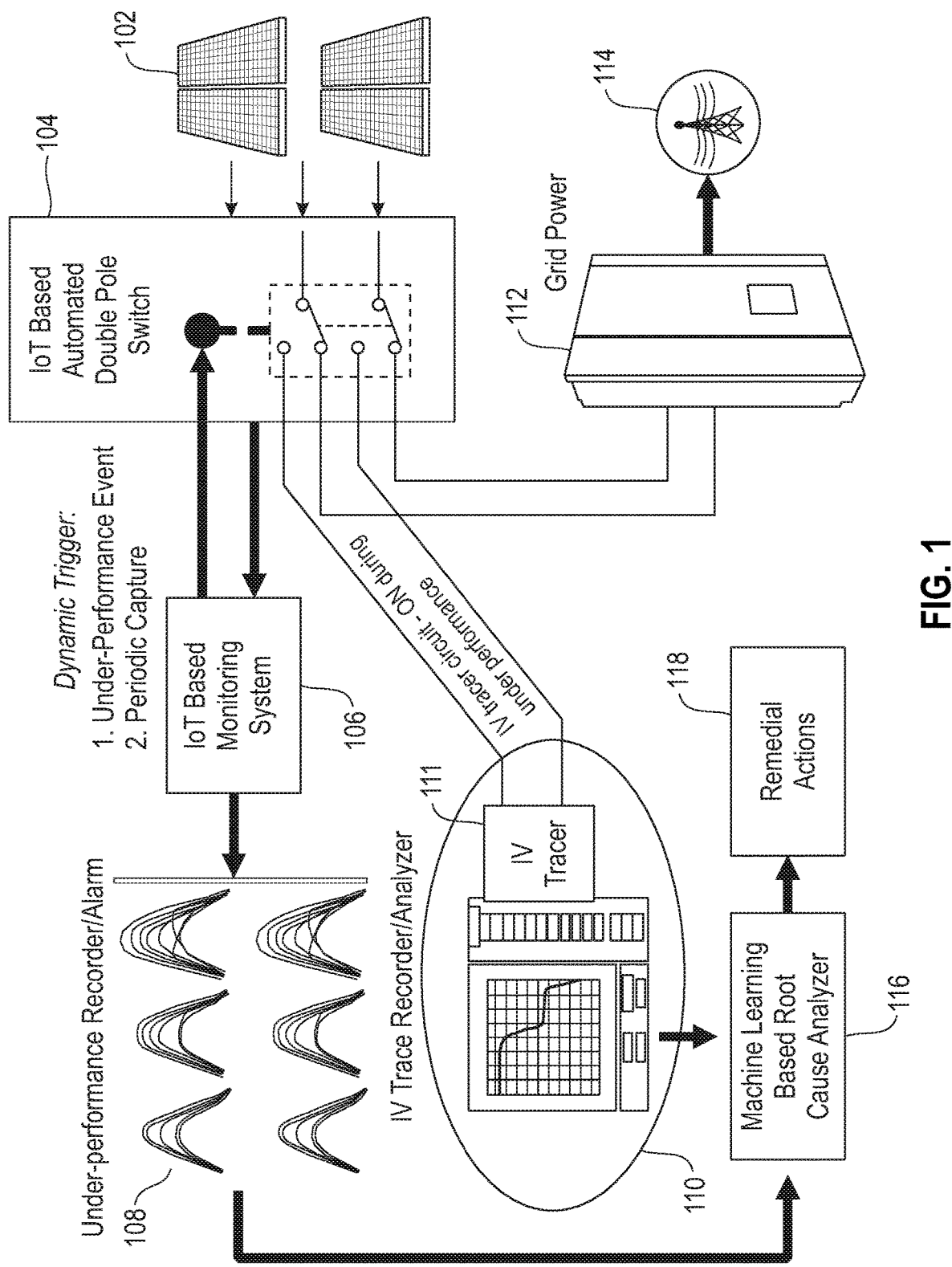
FIG. 1 is a diagram illustrating system architecture, according to an exemplary embodiment of the invention.

As described herein, an embodiment of the present invention includes IoT-enabled solar PV health monitoring and advising related thereto. At least one embodiment of the invention includes providing and/or implementing IoT-enabled solar PV panels for detecting PV underperformance and determining the root cause of the underperformance. Such an embodiment can include implementing two-switch circuitry between an IV (current-voltage) tracer and an inverter for string-by-string switches to an IV trace recorder. In one or more embodiments of the invention, automated dynamic switches are utilized and can be periodically/routinely triggered and/or triggered on an event basis (such as underperformance) to obtain IV samples from the specific panel or string of interest.

Additionally, at least one embodiment of the invention includes using machine learning techniques on the IV traces and recorded IoT data to identify the type(s) of disturbances and/or issues related to the underperformance (such as shading, dust, bird-droppings, pollution, etc.) and the number of PV panels and/or cells affected. In such an embodiment, machine learning-based classifier methods can be implemented to identify the type(s) of anomaly or the root of cause of the underperformance by analyzing one or more specific features from the obtained IV samples.

As detailed herein, the current and the terminal voltage (IV) of a PV panel or system of PV panels are interdependent functions. A trace of the current versus the voltage can provide the operational quality of the corresponding PV panel and the power that can be extracted therefrom. Additionally, in one or more embodiments of the invention, because all of the PV cells in a PV panel carry the same current, an environmental effect on a PV cell or a group of PV cells in the PV panel can have a direct implication on the current that can flow among the PV cells, given the terminal voltage. As such, an IV trace can provide useful information about the state of the PV panel.

The current (hence the power output) of a PV panel is a function of the terminal direct current (DC) voltage of the system. This terminal voltage can be optimized to extract the maximum power, for example, by the maximum power point tracking (MPPT) algorithm. Traditional solar farms have strings directly connected to inverters. Additionally, an IV trace requires a series connection of the strings with the device load. For an IV trace of a running system, a temporary disconnection of the strings with the inverter is required, but traditional farms do not have this facility. Accordingly, at least one embodiment of the invention can include providing and/or implementing an IoT-based switching system to temporarily disconnect the inverter and connect the strings to an IV tracer device. Once the trace is obtained and recorded, the strings can be connected back to the inverter.

Because such an operation is alarm-based, in one or more embodiments of the invention, only IV traces of under-performing strings are obtained. This can include a localized operation, and the disconnection can result in a dip/decrease in power output. Additionally, in at least one embodiment of the invention, IV curve fingerprints and/or patterns of anomalies are observed as stationary in correspondence to their anomaly type/class (soiling, shading, shadowing, panel crack, etc.). As used here, stationary implies not in/matching a given anomaly class. As also detailed herein, hardware issues such as cracks or hotspots in PV cells can result in performance issues, resulting in shorting of bypass diodes. Such hardware-related issues can also be represented in an IV trace.

Also, a low consistent open circuit voltage ($V_{OC}$) of a PV panel ascertained by an IV trace could point towards aging of the PV panel. Additionally, at times, predicted power output can be much higher than the actual output. If IV traces, taken under such an alarm point towards lower $V_{OC}$, it can be an indication that the measured temperature is lower than the actual temperature, and there could be some problem in the thermal connection in the temperature sensing module of the PV panel. Further, failure of bypass diodes can be represented as reduced short circuit current ($I_{sc}$) in an IV trace, while under-performance without any visible differences from IV traces can be an indication of an erroneous prediction of solar irradiance. Moreover, ground faults in a system of PV circuits can result in a lower $V_{OC}$ in a series-connected system.

FIG. 1 is a diagram illustrating system architecture, according to an embodiment of the invention. By way of illustration, FIG. 1 depicts solar PV panels 102, an IoT-based automated double pole switch 104, an IoT-based monitoring system 106, an under-performance recorder/alarm 108, an IV trace recorder/analyzer 110, which includes an IV tracer 111, and a machine learning- (ML-) based root cause analyzer 116 (which generates and outputs suggestions for one or more remedial actions 118). FIG. 1 also depicts a grid tie inverter 112 which converts DC power to alternating current (AC) power and supplies power from the solar panels 102 to the grid 114.

More specifically, FIG. 1 depicts IoT-enabled automated dynamic intervention of IV record circuitry. Accordingly, the IV trace recorder/analyzer 110 is dynamically connected through the IoT-based automated double pole switch 104, and can be used in conjunction with the IoT-based monitoring system 106 for under-performance detection (via post-anomaly classification) and periodic data capture (which can subsequently be used for predictive anomaly detection). The IoT-based automated double pole switch 104 connects the IV tracer 111 and disconnects the inverter 112 momentarily (for example, for approximately two seconds at a time) in a dynamic manner. The IV tracer 111 records (via component 110) IV sequences on panel-by-panel or string-by-string basis. As used herein a string refers to a collection of panels that are connected in series and form a single entity that can be connected to an inverter. Additionally, as used herein, a PV panel refers to a collection of PV cells.

Via root cause analyzer 116, ML-based techniques can be used on the IV traces and recorded IoT data to identify one or more types of disturbances and/or anomalies (shading, dust, bird-droppings, pollution, etc.), the number of PV panels and/or PV cells affected by the disturbance(s) and/or anomaly(ies), one or more harmful and/or disadvantageous side effects that can occur (overheating, etc.) as a result of the disturbance(s) and/or anomaly(ies), and localization of the affected PV string (using string circuitry of IV curve and feeder information.) As noted above, one or more remedial actions 118 (such as a work order or crew dispatch, for example) is generated and suggested based on the analysis of the root cause analyzer 116.

In connection with one or more embodiments of the invention, strings can be connected to inverters in housings that are some distance apart, wherein the distance is generally a function of the inverter rating and the size of the solar farm. Inverters with higher power ratings can be a greater distance apart, and can be connected to multiple strings. If the inverter housings are separated by a significant distance, each inverter housing/string can also have their own IV tracer(s) as a standalone device. If the distance is less significant, multiple strings and/or inverters can share the same IV tracer(s). Such an arrangement can necessitate extra wiring connections, as the string connections is to be multiplexed to the same IV tracer device. Depending upon the above factors, the number of IV tracer devices required can be determined.

As detailed herein, one or more embodiments of the invention include dynamic IoT-enabled switching. Switching on under-performance can enable visibility to a detected anomaly to perform root cause analysis and classify the anomaly type. Switching on a periodic basis can include, for example, periodically collecting a time series of IV records of observation for one or more PV panels and/or strings. Time series data of IV records can be used for prediction of future anomaly type. For example, IV time series data can be used to predict anomalies (at a future point in time) which have time dependencies, such as dust deposition level growing/reducing with time.

As also illustrated in FIG. 1 and further detailed herein, the classification of anomaly type can be performed through one or more machine learning-based classification methods. By way of example, at least one embodiment of the invention can include converting IV data to sequential data and performing sequential classification (for instance, using two-layer LSTM (long short term memory) based architecture. Alternatively, one or more embodiments of the invention can include extracting anomaly-relevant specific IV features and performing feature-based classification using ML methods (such as random forest, support vector machines (SVMs), etc.).

As noted herein, anomaly classes and/or types can include dust-related classes, shadowing, blob or bird dropping types, panel damage, etc. Detecting the particular classes and/or types can be based on multiple factors and/or methods. For dust-related classes, for example, detection can be based on the spread of the dust covering part of a panel, a full column, a full panel, etc., as well as on distribution of the dust (for instance, patchy, uniform, etc.) and thickness of the dust layer(s). For shadowing types, detection can be based on coverage (partial cell or column coverage, full cell or column coverage, etc.) as well as one or more temporal parameters (fixed-sized shadow, time-varying shadow, etc.). For blob or bird dropping types, detection can be based on the number of blobs or droppings per column, the size of the blobs or droppings, the ratio of blob/dropping size to cell size over a threshold value, and/or blob/dropping thickness. Additionally, for panel damage and/or aging types, detection can based on panel micro-cracks, panel discoloration, etc.

Figure 2:
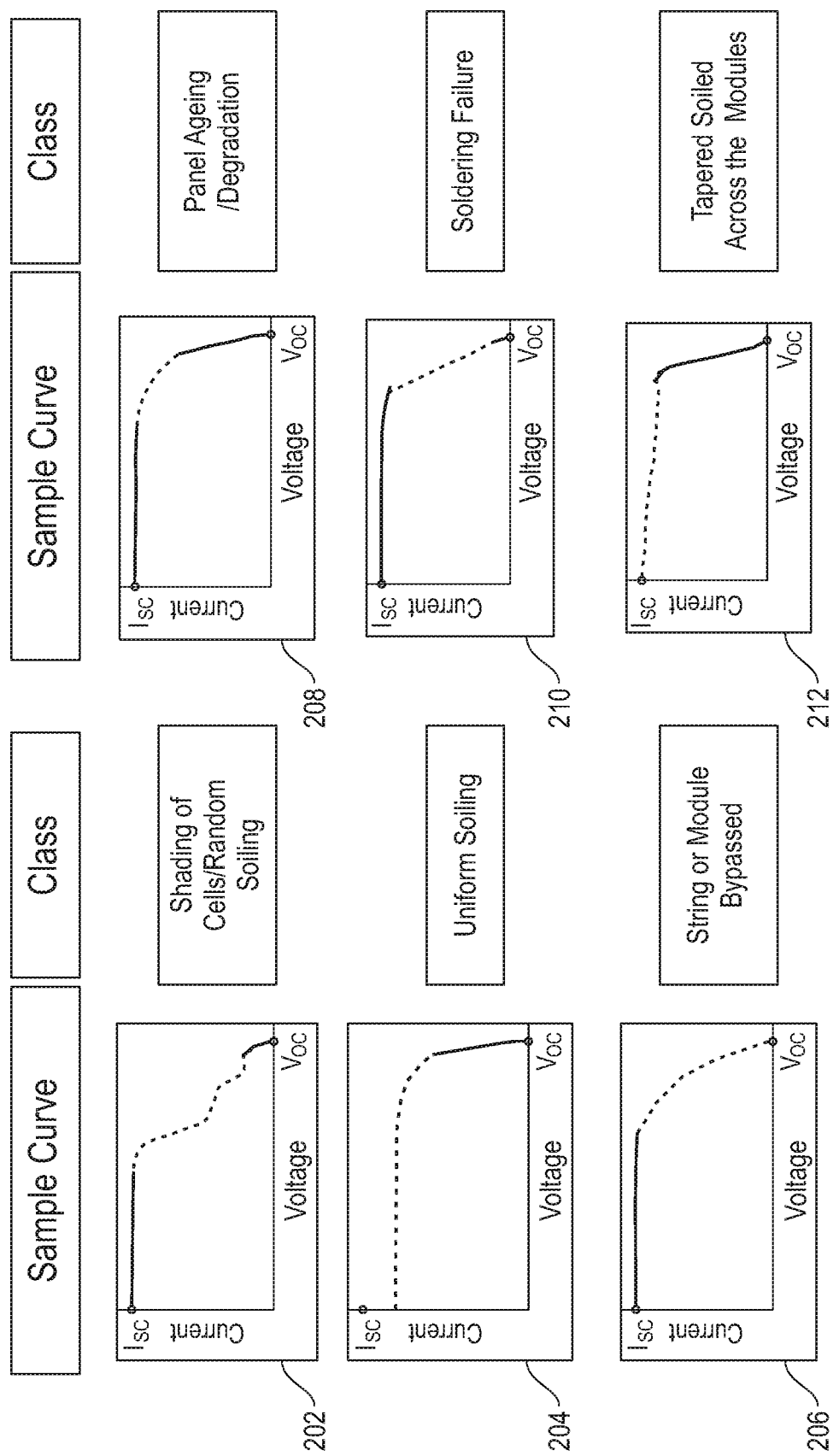
FIG. 2 is a diagram illustrating example anomaly types and corresponding example IV curves, according to an exemplary embodiment of the invention.

FIG. 2 is a diagram illustrating example anomaly types and corresponding example IV curves, according to an exemplary embodiment of the invention. By way of illustration, FIG. 2 depicts sample curve 202 (which corresponds to shading of cells and/or random soiling), sample curve 204 (which corresponds to uniform soiling), sample curve 206 (which corresponds to a bypassed string or module), sample curve 208 (which corresponds to panel aging and/or degradation), sample curve 210 (which corresponds to soldering failure(s)), and sample curve 212 (which corresponds to tapered soiling across modules).

Figure 3:
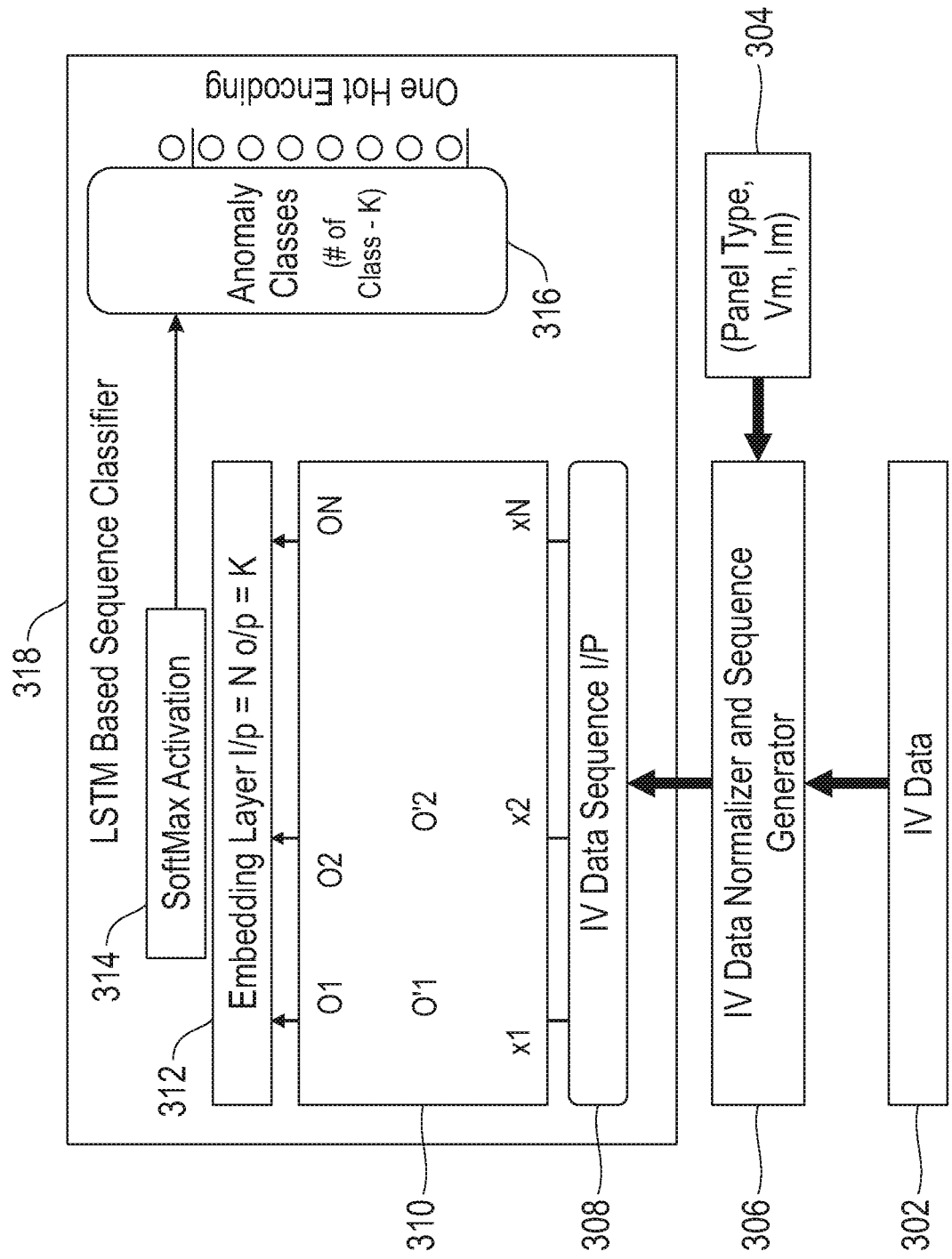
FIG. 3 is a diagram illustrating architecture of an IV (current-voltage) sequence-based classifier for root cause analysis, according to an exemplary embodiment of the invention.

FIG. 3 is a diagram illustrating architecture of an IV sequence-based classifier for root cause analysis, according to an exemplary embodiment of the invention. By way of illustration, FIG. 3 depicts an IV data normalizer and sequence generator 306, which receives input in the form of an IV data sequence {I(t), V(t)} 302 as well as a maximum I and V, that is, $\{\overline{I}_m, \overline{V}_m\}$ from a characteristic IV data sheet 304 for each panel type m. For each panel type, the IV data normalizer and sequence generator 306 normalizes I and V, that is, $$\hat{I}(t) = \frac{I(t)}{\overline{I}_m} \text{ and } \hat{V}(t) = \frac{V(t)}{\overline{V}_m},$$

such that $(\hat{I}(t), \hat{V}(t)) \in \{0,1\}$, which is now panel type invariant. Panel type normalization can be extended to string-level to make it both string and panel invariant. $(\hat{I}(t), \hat{V}(t))$ is processed through a digital-to-analog converter (DAC) to convert an analog current corresponding to a voltage sequence. The analog current is then processed through an N sample analog-to-digital converter (ADC), which provides a current sequence $\widehat{I_N}(t)$ but at fixed N sample points wherein the time t corresponds to $\widehat{V_N}(t)$. The process effectively yields an up/down sampled version of original $\hat{I}(t)$ to an N sample point sequence $\widehat{I_N}(t)$. The sequence 308 is then fed to a LSTM-based sequence classifier 318, as depicted in FIG. 3.

At least one embodiment of the invention includes the use of a multi-layer LSTM-based sequence classifier. Each LSTM unit takes an input sequence (as detailed above), which is then fed to another layer 310 (as in architecture). Layer 310 can include a set of N LSTM cells grouped together. Note that LSTM is used here merely as an example for IV data classification, and other ML sequential data classifier models and/or architectures can be in one or more embodiments of the invention.

The output of LSTM layer 310 is fed to an embedding layer 312 (for example, an FC layer) of dimension N×K, that is, an input (I/P)=N and output (O/P)=K size vector. Further, a softmax activation layer 314 is used to map with K classes by K length vector representation. In such an embodiment as depicted in FIG. 3, softmax represents a function which is given as softmax(k)=exp(k)/sum exp(j), for all j=1, K. This function converts the a number (which can be negative) to probabilities providing high probability to one element of a K-sized vector. This output is then used to predict one class through one-hot encoded classes. Accordingly, the LSTM-based sequence classifier 318 (via the softmax activation layer 314) can map the current sequence $\widehat{I_N}(t)$ to the disturbance/anomaly classes of K types. The representation of anomaly classes 316 can be similar, for example, to one hot encoding. Additionally, in one or more embodiments of the invention, the number of layers of the LSTM selected and/or utilized (for example, two) can vary from case to case.

Further, in at least one embodiment of the invention, training an LSTM-based sequence classifier 318 can include creating a list or library of anomaly/disturbance types with corresponding IV data sequences and panel information from data sheets (for use by the IV data normalizer and sequence generator 306), and training the classifier 318 with IV data sequences with corresponding anomaly class labels.

Figure 4:
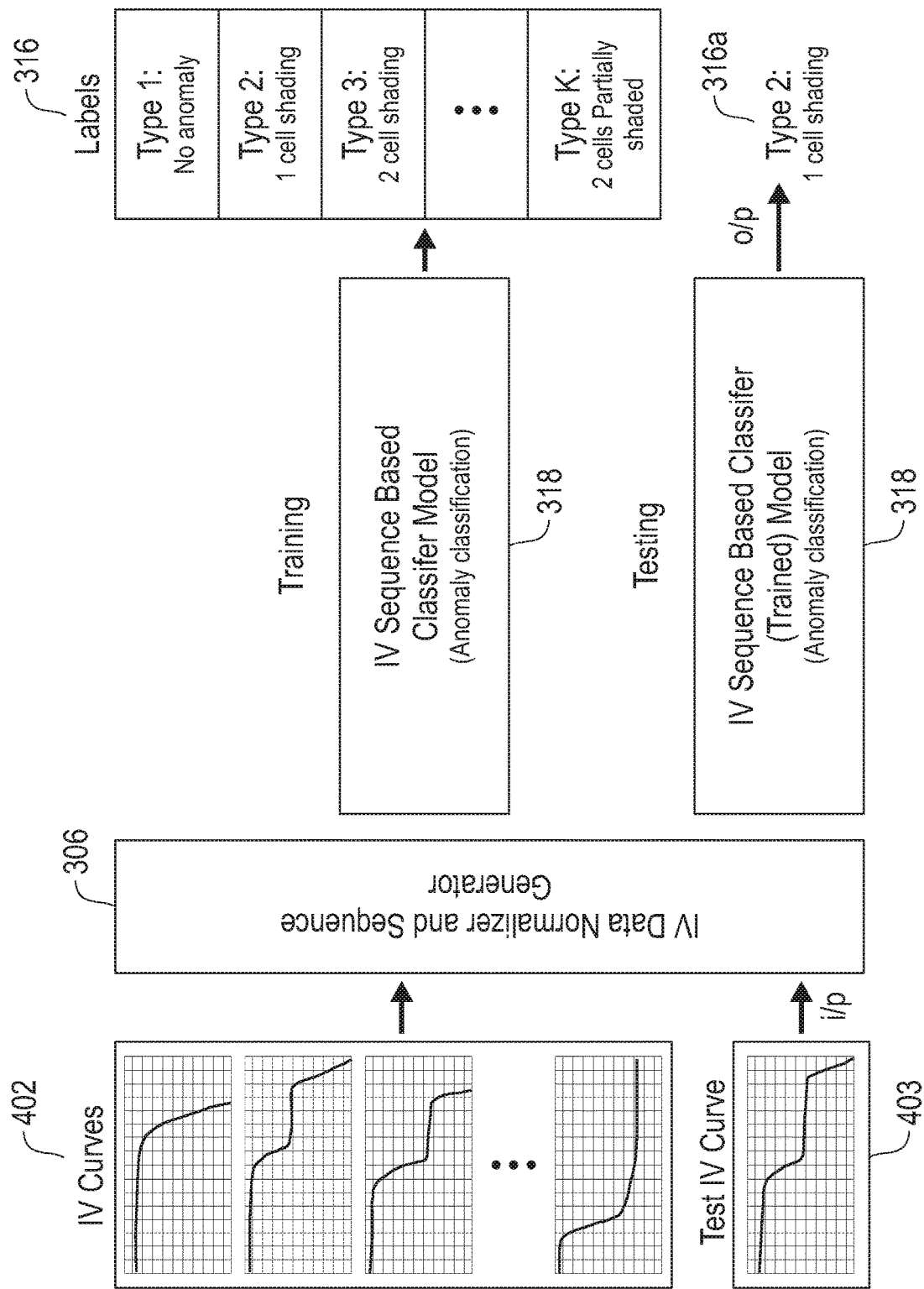
FIG. 4 is a diagram illustrating IV sequence-based anomaly type classification, according to an exemplary embodiment of the invention.

For example, FIG. 4 is a diagram illustrating IV sequence-based anomaly type classification, according to an exemplary embodiment of the invention. By way of illustration, FIG. 4 depicts IV curves 402 fed to IV data normalizer and sequence generator 306, which uses the IV curves 402 to train the IV sequence-based classifier 318 to generate a number of labels of anomaly classes 316. In testing the IV sequence based classifier 318, a test IV curve 403 is fed to the IV data normalizer and sequence generator 306, which generates and outputs a sequence to the trained IV sequence-based classifier 318, which then outputs one of the labels 316a corresponding to the input sequence.

Figure 5:
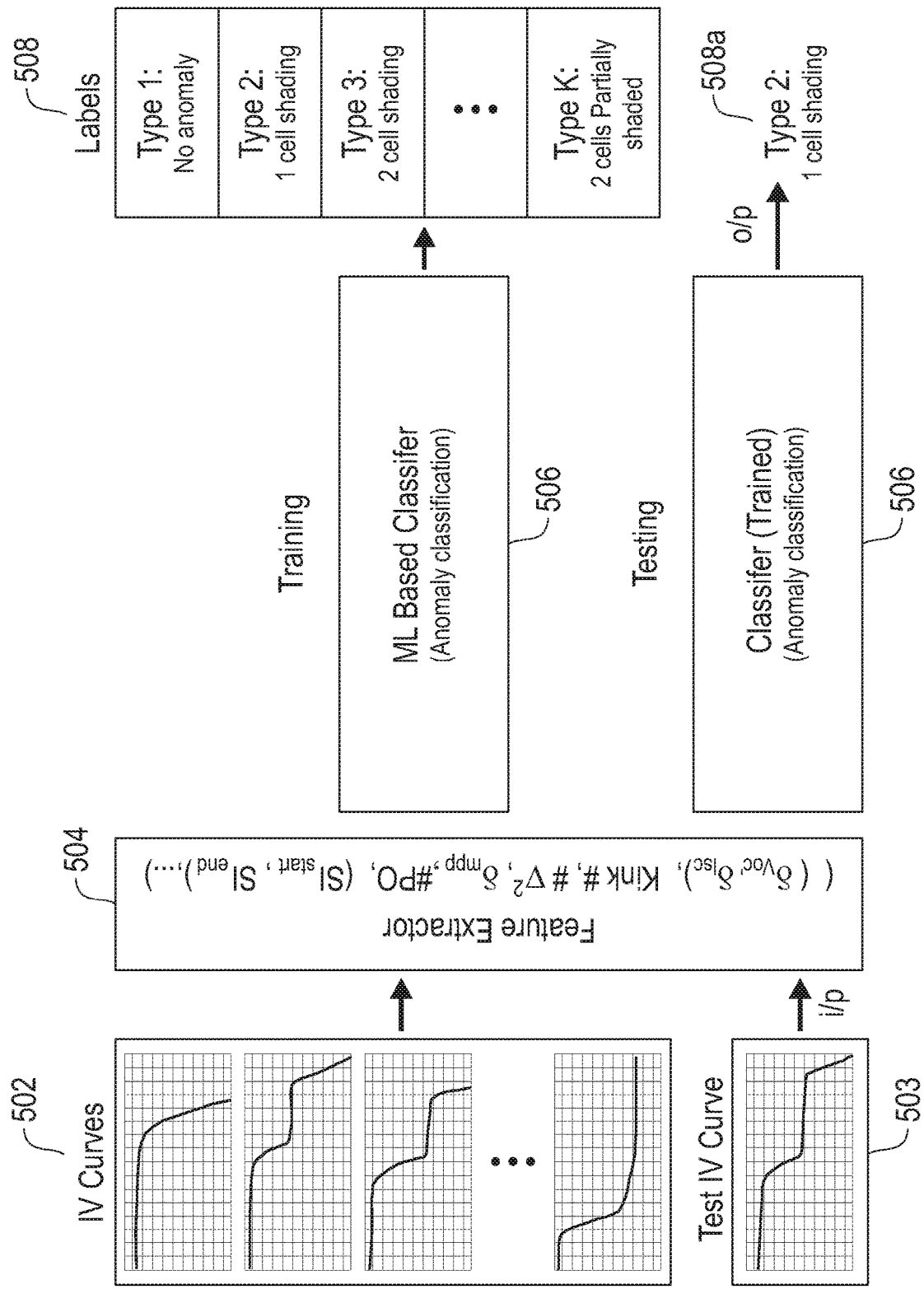
FIG. 5 is a diagram illustrating IV feature-based anomaly type classification, according to an exemplary embodiment of the invention.

At least one embodiment of the invention can additionally include feature engineering for anomaly classification. FIG. 5 is a diagram illustrating IV feature-based anomaly type classification, according to an exemplary embodiment of the invention. By way of illustration, FIG. 5 depicts IV curves 502 fed to a feature extractor 504, which uses one or more features extracted from the IV curves 502 to train a ML-based classifier 506 to generate a number of labels of anomaly classes 508. In testing the ML-based classifier 506, a test IV curve 503 is fed to the feature extractor 504, which extracts (from test IV curve 503) and outputs one or more features to the ML-based classifier 506, which then outputs one of the labels 508a corresponding to the input feature(s).

In such an embodiment, the feature extractor 504 can incorporate multiple parameters. Such parameters can include, for example $\delta_{V_{oc}}, \delta_{I_{sc}}$), which indicates the deviation of $V_{oc}$ and $I_{sc}$ from an ideal condition; that is, $\delta_{V_{oc}} = V_{oc} -$ $\hat{V}_{oc}$, $\delta_{Isc}=I_{sc}-\hat{I}_{sc}$. Such parameters can also include, for example, the number of kinks, wherein a kink is detected when the slope changes from positive to negative by approximately 90 degrees; that is, $\Delta_1>0$, $\Delta_2<0$, and $(\Delta_1-\Delta2)\sim 90$ (a threshold) degree. Further, such parameters can include #∇2, the slope change-over number, wherein a slope change-over is defined by the number of times that the second derivative of I takes positive value (which approximately represents the non-smoothness of the curve). Such parameters can additionally include $\delta_{mpp}$, which represents a deviation of $P_{mpp}$ from an ideal case; that is $\delta_{mpp}=P_{mpp}-\hat{P}_{mpp}$, wherein $\hat{P}_{mpp}=\max V_t I_t$ and t represents an index. Also, such parameters can include #PO, which represents an order of polynomial fit with an IV curve. Enlarging such a value captures a number of large patches or blobs on a given PV panel. Additionally, such parameters can also include $(SI_{start}, SI_{end})$, a tuple which represents the region between starting and ending points (voltage) wherein slope is a constant; that is, $\Delta^2=0$. This feature can approximately capture the fingerprint of uniform dust, soldering damages, etc.

Figure 6:
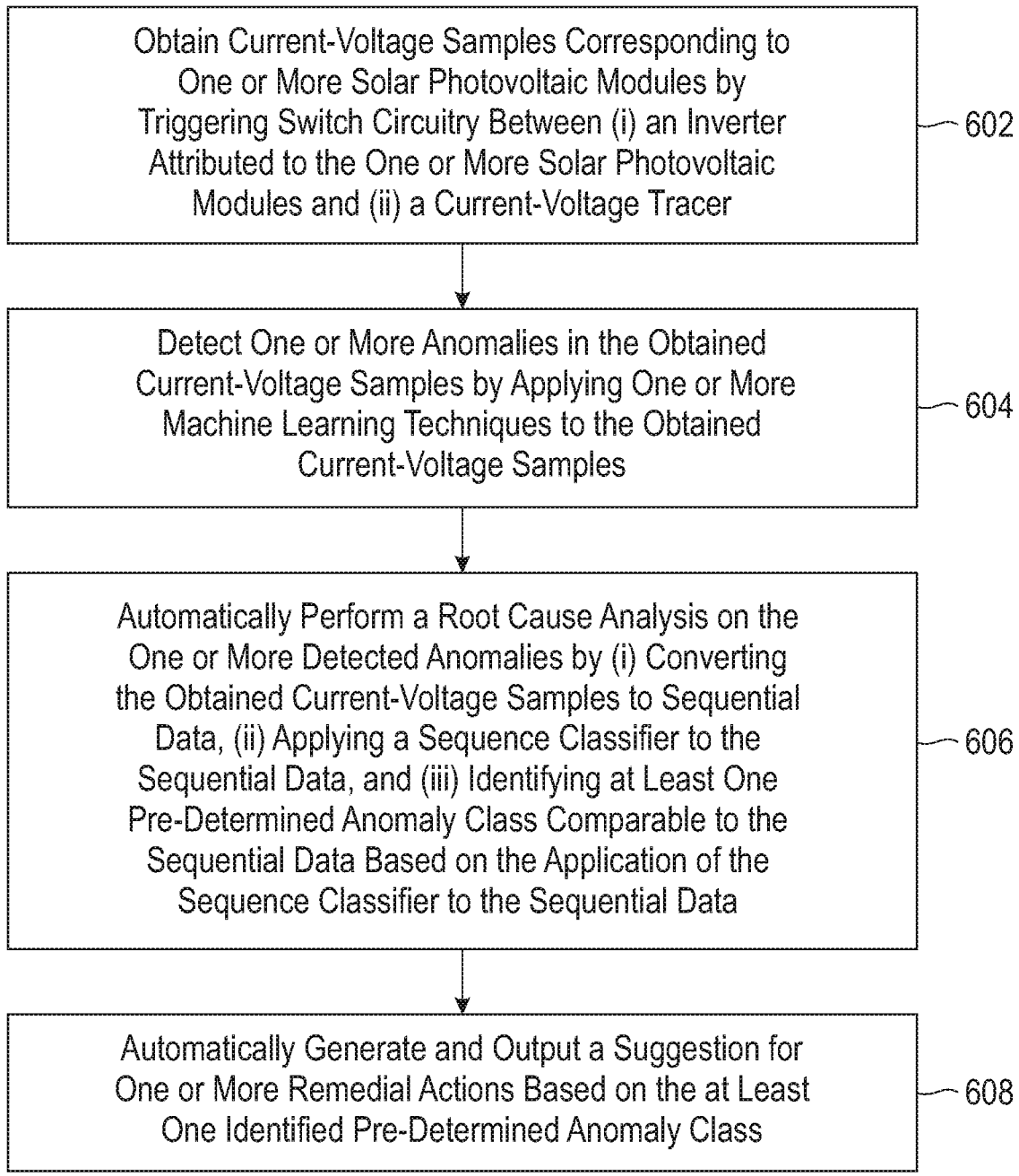
FIG. 6 is a flow diagram illustrating techniques according to an embodiment of the invention.

FIG. 6 is a flow diagram illustrating techniques according to an embodiment of the present invention. Step 602 includes obtaining current-voltage samples corresponding to one or more solar photovoltaic modules by triggering switch circuitry between (i) an inverter attributed to the one or more solar photovoltaic modules and (ii) a current-voltage tracer. The one or more solar photovoltaic modules can include one or more solar photovoltaic cells and/or one or more solar photovoltaic panels. Additionally, the one or more solar photovoltaic modules can include one or more IoT-enabled solar photovoltaic modules and the switch circuitry can include IoT-based switch circuitry.

Triggering can include triggering the switch circuitry on a periodic basis and/or triggering the switch circuitry on an event basis (wherein the event can include under-performance of one or more expected parameters associated with the one or more solar photovoltaic modules). Also, triggering the switch circuitry can include (i) temporarily disconnecting the inverter from the one or more solar photovoltaic modules and (ii) temporarily connecting the one or more solar photovoltaic modules to the current-voltage tracer.

Step 604 includes detecting one or more anomalies in the obtained current-voltage samples by applying one or more machine learning techniques to the obtained current-voltage samples. Step 606 includes automatically performing a root cause analysis on the one or more detected anomalies by (i) converting the obtained current-voltage samples to sequential data, (ii) applying a sequence classifier to the sequential data, and (iii) identifying at least one pre-determined anomaly class comparable to the sequential data based on the application of the sequence classifier to the sequential data. The sequence classifier can include an LSTM-based sequence classifier. Also, the at least one pre-determined anomaly class can include shading, dust, droppings, pollution, module aging, soldering failure, and/or hardware-related issue. Further, automatically performing a root cause analysis can also include determining the number of solar photovoltaic modules affected by the one or more detected anomalies.

Step 608 includes automatically generating and outputting a suggestion for one or more remedial actions based on the at least one identified pre-determined anomaly class.

Also, an additional and/or alternative embodiment of the invention includes automatically performing a root cause analysis on the one or more detected anomalies by (i) extracting one or more features from the obtained current-voltage samples, (ii) applying a feature-based classifier to the one or more extracted features, and (iii) identifying at least one pre-determined anomaly class comparable to the obtained current-voltage samples based on the application of the feature-based classifier to the one or more extracted features. In such an embodiment, the feature-based classifier can include one or more support vector machines and/or one or more random forests.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 7:
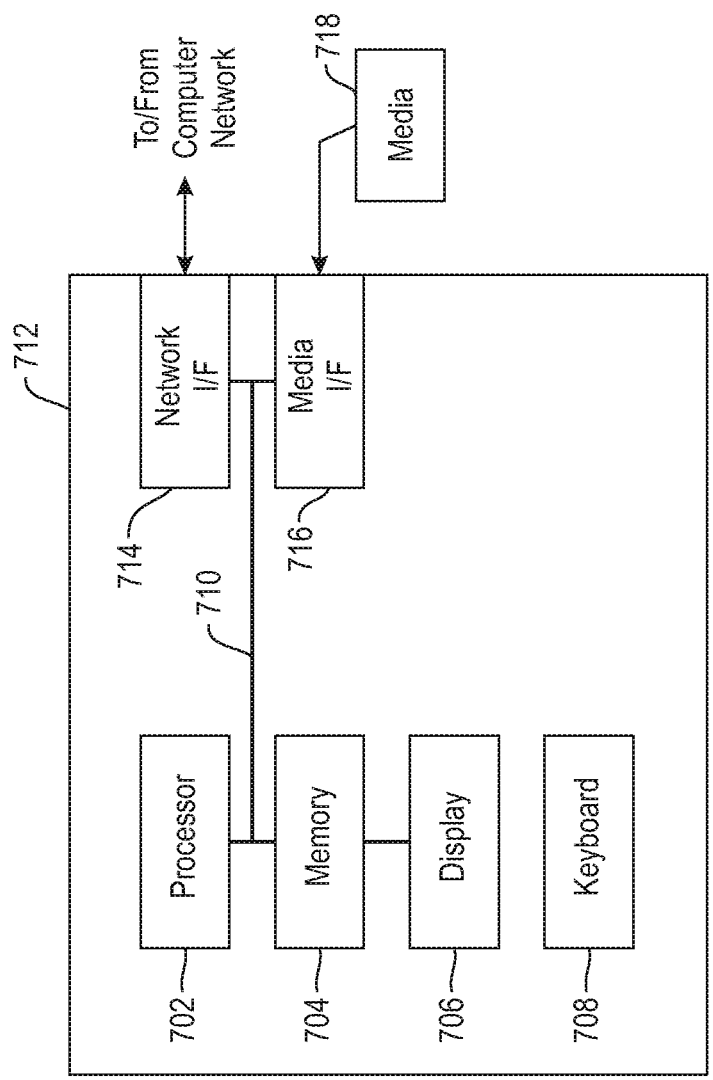
FIG. 7 is a system diagram of an exemplary computer system on which at least one embodiment of the invention can be implemented.

Additionally, an embodiment of the present invention can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
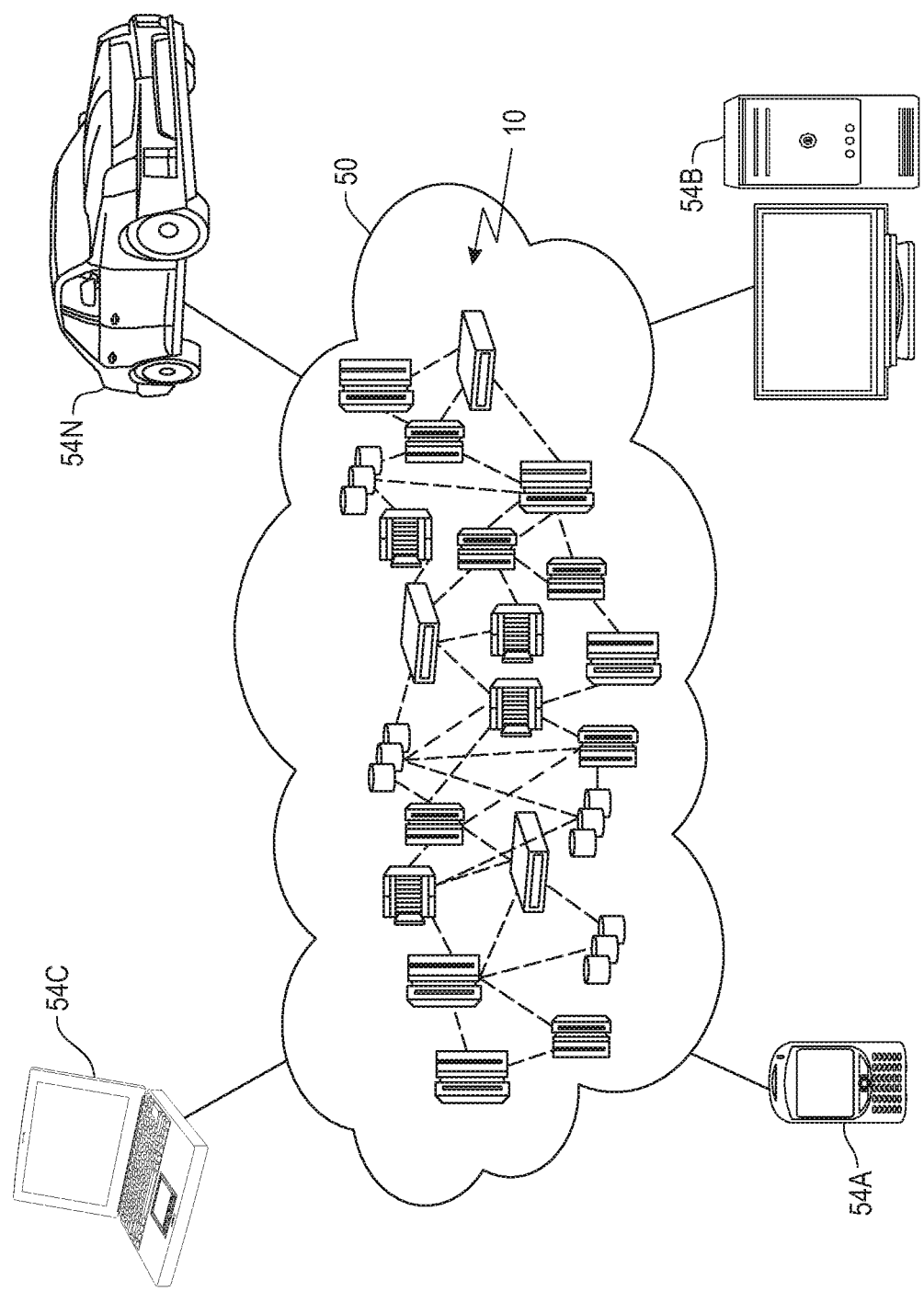
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
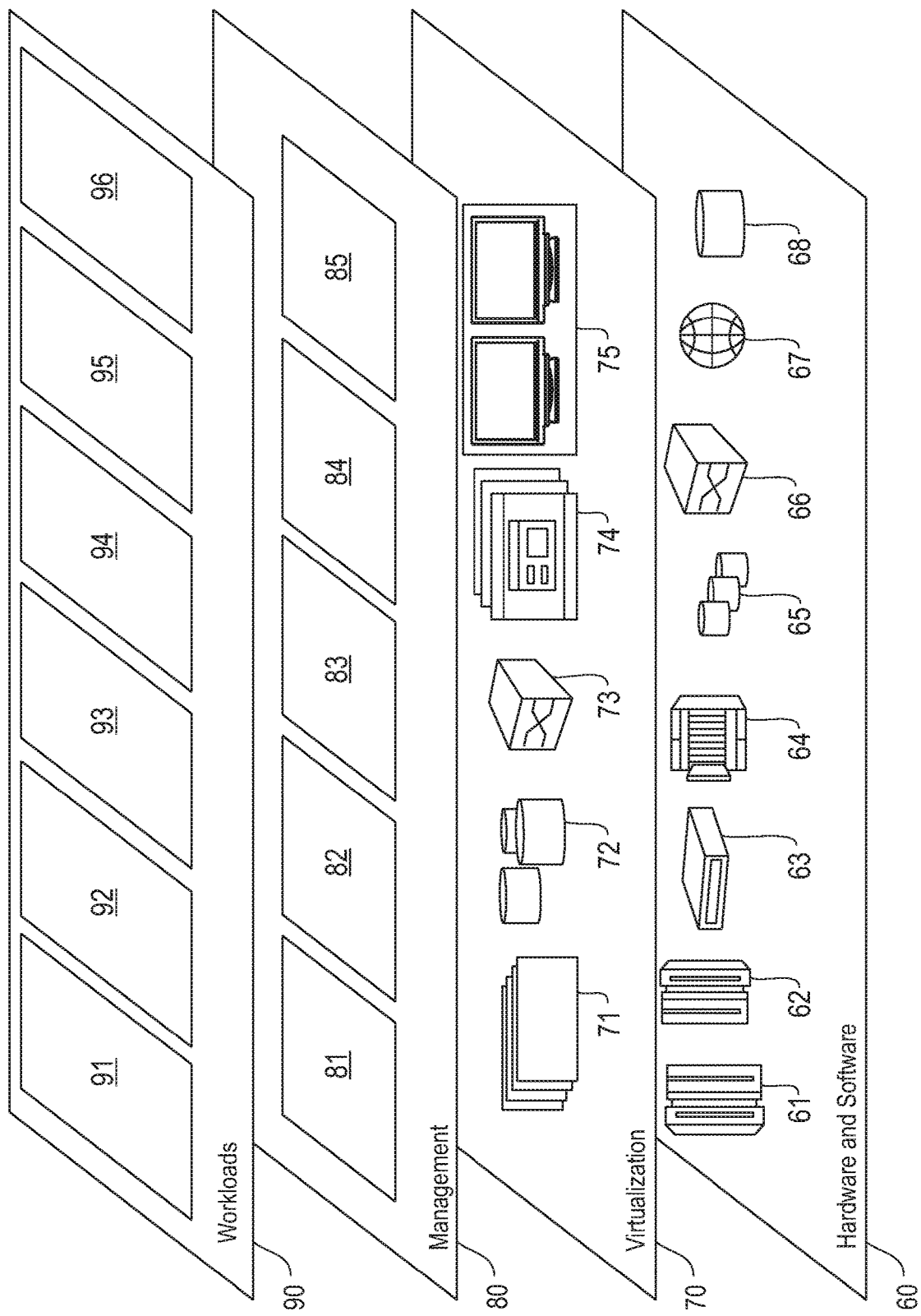
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and PV health monitoring and advising 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, applying machine learning techniques on IV traces to determine root cause for PV underperformance issues. Additionally, one or more embodiments of the invention can assist in reducing losses by localizing and identifying fundamental anomalies.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising steps of:

obtaining current-voltage samples corresponding to one or more particular solar photovoltaic modules from among plurality of photovoltaic modules by triggering Internet of Things-based switch circuitry between (i) an inverter attributed to the one or more particular solar photovoltaic modules and (ii) a current-voltage tracer, wherein said triggering comprises triggering the switch circuitry in response to under-performance of one or more expected parameters associated with the one or more solar photovoltaic modules;
detecting one or more anomalies in the obtained current-voltage samples by applying one or more machine learning techniques to the obtained current-voltage samples;
automatically performing a root cause analysis on the one or more detected anomalies by (i) converting the obtained current-voltage samples to sequential data, (ii) applying a sequence classifier to the sequential data, and (iii) identifying at least one pre-determined anomaly class comparable to the sequential data based on the application of the sequence classifier to the sequential data, wherein performing the root cause analysis further comprises determining the number of solar photovoltaic modules affected by the one or more detected anomalies; and
automatically generating and outputting a suggestion for one or more remedial actions based on the at least one identified pre-determined anomaly class;
wherein the steps are carried out by at least one computing device.

2. The computer-implemented method of claim 1, wherein the plurality of solar photovoltaic modules comprises one or more solar photovoltaic cells.

3. The computer-implemented method of claim 1, wherein the plurality of solar photovoltaic modules comprises one or more solar photovoltaic panels.

4. The computer-implemented method of claim 1, wherein the plurality of solar photovoltaic modules comprises one or more Internet of Things-enabled solar photovoltaic modules.

5. The computer-implemented method of claim 1, wherein said triggering comprises triggering the switch circuitry on a periodic basis.

6. The computer-implemented method of claim 1, wherein said triggering the switch circuitry comprises (i) temporarily disconnecting the inverter from the one or more particular solar photovoltaic modules and (ii) temporarily connecting the one or more particular solar photovoltaic modules to the current-voltage tracer.

7. The computer-implemented method of claim 1, wherein the sequence classifier comprises a long short-term memory- (LSTM-) based sequence classifier.

8. The computer-implemented method of claim 1, wherein the at least one pre-determined anomaly class comprises at least one of shading, dust, droppings, pollution, module aging, soldering failure, and hardware-related issue.

9. A computer program product comprising a non-transitory computer readable storage medium having program instructions embodied therewith, the program instructions executable by a computing device to cause the computing device to:
obtain current-voltage samples corresponding to one or more particular solar photovoltaic modules from among plurality of photovoltaic modules by triggering Internet of Things-based switch circuitry between (i) an inverter attributed to the one or more particular solar photovoltaic modules and (ii) a current-voltage tracer, wherein said triggering comprises triggering the switch circuitry in response to under-performance of one or more expected parameters associated with the one or more solar photovoltaic modules;
detect one or more anomalies in the obtained current-voltage samples by applying one or more machine learning techniques to the obtained current-voltage samples;
automatically perform a root cause analysis on the one or more detected anomalies by (i) converting the obtained current-voltage samples to sequential data, (ii) applying a sequence classifier to the sequential data, and (iii) identifying at least one pre-determined anomaly class comparable to the sequential data based on the application of the sequence classifier to the sequential data, wherein performing the root cause analysis further comprises determining the number of solar photovoltaic modules affected by the one or more detected anomalies; and
automatically generate and output a suggestion for one or more remedial actions based on the at least one identified pre-determined anomaly class.

10. The computer program product of claim 9, wherein said triggering comprises triggering the switch circuitry on a periodic basis.

11. The computer program product of claim 9, wherein the plurality of solar photovoltaic modules comprises one or more Internet of Things-enabled solar photovoltaic modules.

12. The computer program product of claim 9, wherein said triggering the switch circuitry comprises (i) temporarily disconnecting the inverter from the one or more particular solar photovoltaic modules and (ii) temporarily connecting the one or more particular solar photovoltaic modules to the current-voltage tracer.

13. The computer program product of claim 9, wherein the sequence classifier comprises a long short-term memory- (LSTM-) based sequence classifier.

14. The computer program product of claim 9, wherein the at least one pre-determined anomaly class comprises at least one of shading, dust, droppings, pollution, module aging, soldering failure, and hardware-related issue.

15. A system comprising:
a memory; and
at least one processor operably coupled to the memory and configured for:
obtaining current-voltage samples corresponding to one or more particular solar photovoltaic modules from among plurality of photovoltaic modules by triggering Internet of Things-based switch circuitry between (i) an inverter attributed to the one or more particular solar photovoltaic modules and (ii) a current-voltage tracer, wherein said triggering comprises triggering the switch circuitry in response to under-performance of one or more expected parameters associated with the one or more solar photovoltaic modules;
detecting one or more anomalies in the obtained current-voltage samples by applying one or more machine learning techniques to the obtained current-voltage samples;
automatically performing a root cause analysis on the one or more detected anomalies by (i) converting the obtained current-voltage samples to sequential data, (ii) applying a sequence classifier to the sequential data, and (iii) identifying at least one pre-determined anomaly class comparable to the sequential data based on the application of the sequence classifier to the sequential data, wherein performing the root cause analysis further comprises determining the number of solar photovoltaic modules affected by the one or more detected anomalies; and
automatically generating and outputting a suggestion for one or more remedial actions based on the at least one identified pre-determined anomaly class.

16. A computer-implemented method, the method comprising steps of:
- obtaining current-voltage samples corresponding to one or more particular solar photovoltaic modules from among a plurality of photovoltaic modules by triggering Internet of Things-based switch circuitry between (i) an inverter attributed to the one or more solar photovoltaic modules and (ii) a current-voltage tracer, wherein said triggering comprises triggering the switch circuitry in response to under-performance of one or more expected parameters associated with the one or more solar photovoltaic modules;
- detecting one or more anomalies in the obtained current-voltage samples by applying one or more machine learning techniques to the obtained current-voltage samples;
- automatically performing a root cause analysis on the one or more detected anomalies by (i) extracting one or more features from the obtained current-voltage samples, (ii) applying a feature-based classifier to the one or more extracted features, and (iii) identifying at least one pre-determined anomaly class comparable to the obtained current-voltage samples based on the application of the feature-based classifier to the one or more extracted features, wherein performing the root cause analysis further comprises determining the number of solar photovoltaic modules affected by the one or more detected anomalies; and
- automatically generating and outputting a suggestion for one or more remedial actions based on the at least one identified pre-determined anomaly class;
- wherein the steps are carried out by at least one computing device.

17. The computer-implemented method of claim 16, wherein the feature-based classifier comprises one or more support vector machines.

18. The computer-implemented method of claim 16, wherein the feature-based classifier comprises one or more random forests.

19. The computer-implemented method of claim 16, wherein said triggering comprises triggering the switch circuitry on a periodic basis.

* * * * *